United States Patent [19]

Nakamura et al.

[11] Patent Number: 4,768,103

[45] Date of Patent: Aug. 30, 1988

[54] WRITE CLOCK GENERATOR FOR TIME BASE CORRECTOR INCLUDING FREQUENCY FLUCTUATION AND WRITE CLOCK DIFFERENCE SIGNAL REDUCTION

[75] Inventors: Yoshiyuki Nakamura, Tokyo; Tsutomu Takamori, Kanagawa, both of Japan

[73] Assignee: Sony Corporation, Tokyo, Japan

[21] Appl. No.: 838,950

[22] Filed: Mar. 12, 1986

[30] Foreign Application Priority Data

Mar. 25, 1985 [JP] Japan .............................. 60-060273

[51] Int. Cl.⁴ .............................................. H04N 5/95
[52] U.S. Cl. .................................... 358/337; 358/321; 358/324; 358/338; 360/36.1
[58] Field of Search ................................ 358/320–324, 358/326–327, 337–338; 360/36.1, 36.2

[56] References Cited

U.S. PATENT DOCUMENTS

| | | | |
|---|---|---|---|
| 3,659,040 | 4/1972 | Fujita | 358/320 |
| 3,971,063 | 7/1976 | Michael et al. | 358/320 X |
| 3,988,531 | 10/1976 | Laub | 358/337 |
| 4,015,288 | 3/1977 | Ebihard et al. | 358/320 X |
| 4,063,279 | 12/1977 | Vidovic et al. | 358/337 X |
| 4,438,456 | 3/1984 | Yoshinaka | 358/320 X |
| 4,577,236 | 3/1986 | Takanashi | 358/320 |
| 4,594,616 | 6/1986 | Dischert | 358/337 X |
| 4,597,019 | 6/1986 | Nishimoto et al. | 358/320 |
| 4,613,827 | 9/1986 | Takamori et al. | 360/36.1 X |

*Primary Examiner*—Raymond F. Cardillo
*Assistant Examiner*—W. R. Young
*Attorney, Agent, or Firm*—Ronald P. Kananen

[57] ABSTRACT

A write clock generator for a time base corrector incorporated in a video tape recorder can generate a write clock signal including accurate phase and frequency fluctuation information on a reproduced video signal in spite of a simple circuit configuration. A write clock signal is generated from a VCO oscillated in response to a reproduced burst signal, and further the VCO is so controlled on the basis of frequency difference between the oscillated write clock signal and a frequency fluctuation signal such that the frequency difference may be eliminated. The frequency fluctuation signal is generated in response to a horizontal synchronizing signal so as to include time base fluctuations in a reproduced video signal.

5 Claims, 4 Drawing Sheets

FREQ CHARACTERISTICS OF FREQ DISCRIMINATOR

WRITE CLOCK GENERATOR FOR TIME BASE CORRECTOR INCLUDING FREQUENCY FLUCTUATION AND WRITE CLOCK DIFFERENCE SIGNAL REDUCTION

BACKGROUND OF THE INVENTION

1. Field of the Invention

The present invention relates generally to a write clock generator incorporated in a time base corrector for a video tape recorder and more specifically to a write clock generator which can generate a write clock signal having accurate phase information and accurate frequency information on video signals reproduced from a video tape.

2. Description of the Prior Art

In a time base corrector for a video tape recorder, a synchronizing signal SYNC and a burst signal BURST are separated from a video signal VDIN reproduced from a tape. The write clock generator generates a write clock signal WCK and a write start pulse signal WZERO involving time base fluctuations (i.e. jitter) in synchronism with the above separated signals SYNC and BURST. The write start pulse signal WZERO serves as a head address designation signal for each scanning line to a memory. Memory addresses are incremented in sequence in response to the write clock signal WCK in order to write the reproduced video signal VDIN in a memory scanning line by scanning line. The video signal stored once in the memory is read in response to a read start pulse RZERO and a read clock signal RCK generated from a read clock generator in response to a stable reference pulse signal VDREF. The read video signal is outputted from the time base corrector as a reproduced video signal VDOUT without including jitter together with a synchronizing signal SYNCX, a burst signal BURSTX and a blank pulse BLKX all applied from the read clock generator.

In the time base corrector as described above, in order to accurately write the reproduced video signal in the memory, it is necessary to generate a write clock signal WCK the phase of which accurately varies according to jitter included in the reproduced video signal VDIN, because color offset will be produced.

Japanese Patent App. No. 60-24669 discloses a write clock generator which can accurately generate a write clock signal WCK including phase information and frequency fluctuation information on the reproduced video signal VDIN. In this method, the write clock signal WCK is generated in phase-synchronism with the reproduced burst signal BURST. Although the initial phase information can be included, since it is impossible to give frequency fluctuation information to the write clock signal WCK, this method is not practical in the case where the reproduced video signal includes relatively great frequency fluctuations.

To overcome the above problem, there has been proposed another method in which a write clock signal WCK is generated on the basis of frequency fluctuation information obtained from the reproduced horizontal synchronizing signal SYNC and phase information obtained from the reproduced burst signal BURST. In the write clock generator of this method, the reproduced horizontal synchronizing signal SYNC is applied to a phase locked loop circuit to form a synchronizing signal including frequency fluctuations involved in the reproduced video signal VDIN, and the formed synchronizing signal is phase-shifted so as to synchronize with the phase of the reproduced burst signal BURST. In this method, however, there exist such shortcomings that the circuit is complicated, because the frequency fluctuations are suppressed within ±half wave in digital fashion and further the synchronizing circuit is configured in analog fashion.

SUMMARY OF THE INVENTION

With these problems in mind, therefore, it is the primary object of the present invention to provide a write clock generator for a time base corrector, which can generate a write clock signal including accurate phase information and accurate frequency fluctuation information on a reproduced video signal, in spite of a relatively simple circuit configuration.

To achieve the above-mentioned object, in a write clock generator for a time base corrector for generating a write clock signal to a time base correcting memory on the basis of a burst signal and a horizontal synchronizing signal both separated from a reproduced video signal in order to reduce time base fluctuations involved in the reproduced signal, the write clock generator according to the present invention comprises (a) means for generating a write clock signal in response to a burst signal included in the reproduced video signal, an initial phase of the write clock signal being synchronized with a phase of the burst signal; (b) means for generating a frequency fluctuation signal in response to a horizontal synchronizing signal included in the reproduced video signal; (c) means for detecting a difference in frequency between the write clock signal and the frequency fluctuation signal and generating a frequency difference signal; and (d) means connected to said write clock signal generating means, for controlling a frequency of the write clock signal so that the difference in frequency between the write clock signal and the frequency fluctuation signal is reduced to zero in response to the frequency difference signal.

The write clock signal generating means comprises a start pulse generator and a start-stop VCO. The frequency fluctuation signal generating means comprises a PLL circuit. The frequency difference detecting means comprises a frequency discriminating circuit including first and second switching circuits and a frequency discriminator, first and second holding circuits, and a differential voltage detector.

The VCO starts to oscillate in response to a start pulse signal STRT generated by the start pulse generator in response to a reproduced burst signal BURST and outputs a write clock signal WCK. Therefore, the initial phase of the write clock signal WCK is in synchronism with the reproduced burst signal BURST, that is, with the phase of the reproduced video signal. The frequency of the write clock signal WCK is detected by the frequency discriminator in the form of an amplitude of a voltage signal, and held by the first holding circuit as a dc voltage signal.

On the other hand, the PLL circuit generates a frequency fluctuation signal S19 in response to a reproduced horizontal synchronizing signal H so as to include time base fluctuations, and held by the second holding circuit in the same way. The differential voltage detector applies a dc control signal representative of a difference in frequency between the two signals WCK and S19 to the VCO so as to eliminate the frequency difference. Therefore, the generated write clock signal WCK includes accurate phase information and accurate time base fluctuation information on a reproduced video signal VDIN. Thus, it is possible to obtain a video signal of good reproducibility in spite of a relatively simple circuit configuration.

BRIEF DESCRIPTION OF THE DRAWINGS

The features and advantages of the write clock generator for a time base corrector according to the present invention will be more clearly appreciated from the following description of the preferred embodiment of the invention taken in conjunction with the accompanying drawings in which.

DETAILED DESCRIPTION OF THE PREFERRED EMBODIMENTS

To facilitate an understanding of the present invention, a brief reference will be made to a time base corrector used for a video tape recorder, to which the write clock generator according to the present invention is applied.

Figure 1:
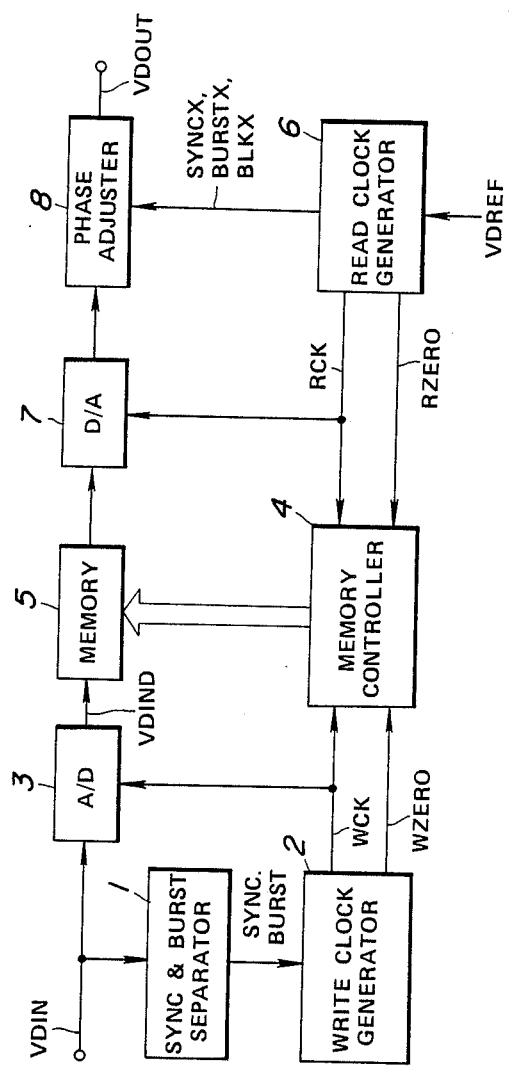
FIG. 1 is a schematic block diagram showing the whole circuit configuration of a time base corrector in which the write clock generator according to the present invention is to be incorporated.

With reference to FIG. 1, a video signal VDIN is reproduced from a tape. A reproduced synchronizing signal SYNC and a reproduced burst signal BURST are separated from a reproduced video signal VDIN through a synchronizing and burst signal separator 1. The two separated signals SYNC and BURST are applied to a write clock generator 2.

The write clock generator 2 generates a write clock signal WCK and a read start pulse signal WZERO in synchronism with a reproduced synchronizing signal SYNC and a reproduced burst signal BURST both having fluctuations on a time base. The write clock signal WCK is given to an analog-digital converter 3 as a sampling pulse signal and also to a memory controller 4 together with the write start pulse signal WZERO.

In response to the write start pulse signal WZERO, the memory controller 4 designates each head address of each scanning line to a memory 5 and thereafter writes video signal data VDIND obtained from an analog-to-digital converter 3 for each scanning line (i.e. for each 1H) in the memory 5 in sequence by sequentially incrementing the address in response to the write clock signal WCK.

The data written in the memory 5 are read in response to a read clock signal RCK and a read start pulse signal RZERO generated from a read clock generator 6 on the basis of a reference pulse signal VDREF having a stable period.

The video signal data are converted into analog signals through a digital-to-analog converter 7 driven in response to the read clock signal RCK and then applied to a phase adjuster 8. The phase adjuster 8 generates a reproduced video output signal VDOUT together with a synchronizing signal SYNCX, a burst signal BURSTX, and a blank pulse BLKX all given from the read clock generator 6.

In the time base corrector as shown in FIG. 1, when video signal data are written in the memory 5 for each scanning line, if an accurate write clock signal WCK, the phase of which accurately varies according to jitter included in the reproduced video signal VDIN, is not generated, it is impossible to correctly write the reproduced video signal in the memory 5. That is to say, it is impossible to obtain reproduced video output signals VDOUT of good reproducibility, because color offset will be produced.

In view of the above description, reference is now made to a first embodiment of the write clock generator for a time base corrector according to the present invention.

Figure 2:
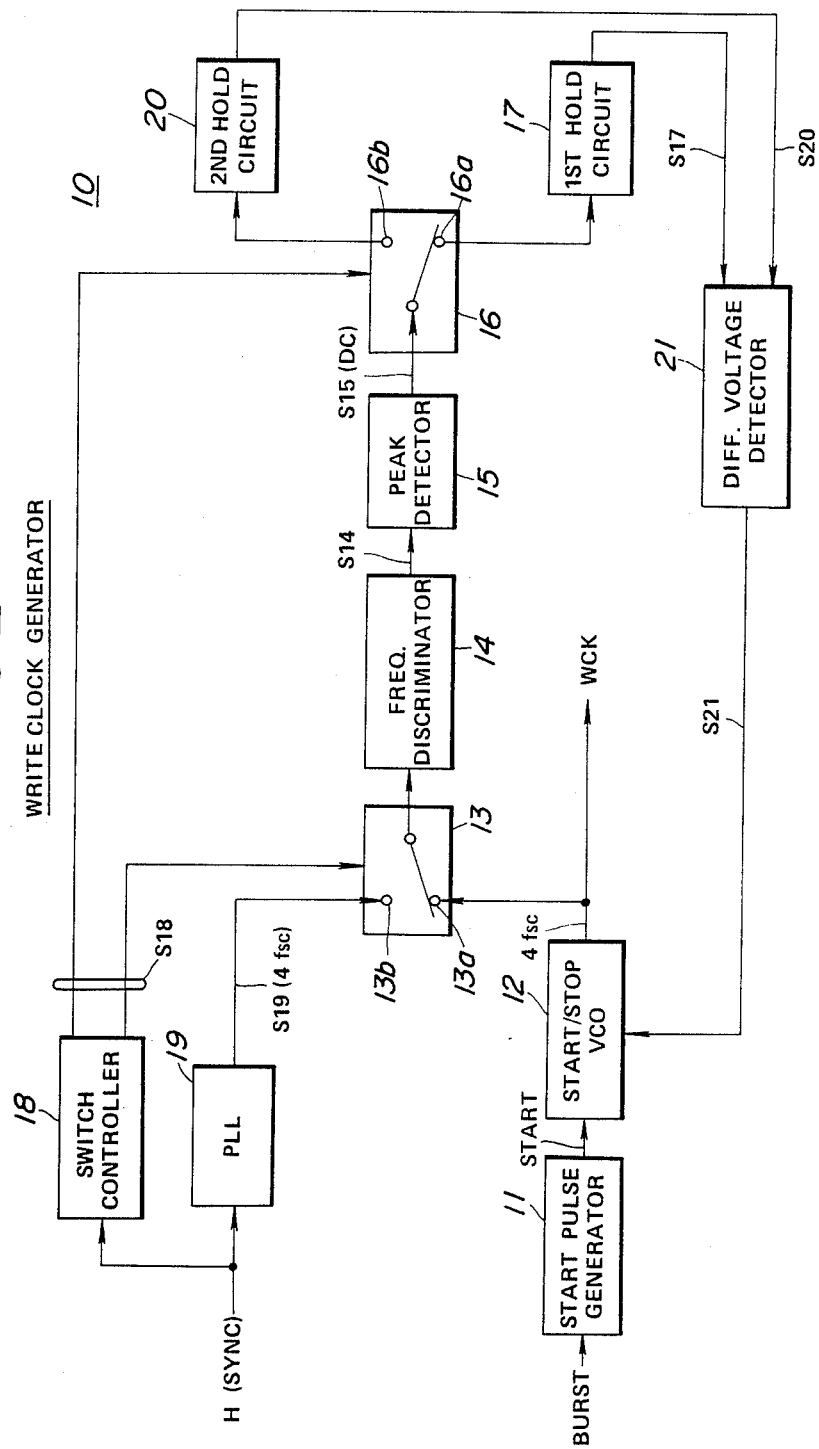
FIG. 2 is a schematic block diagram showing a first embodiment of the write clock generator according to the present invention.

With reference to FIG. 2, a first embodiment of the present invention will be described. In the drawing, the reference numeral 10 denotes a write clock generator to be incorporated in the time base corrector shown in FIG. 1.

In the write clock generator 10, the reproduced burst signal BURST separated through the synchronizing burst separator 1 (shown in FIG. 1) is given to a start pulse generator 11. The start pulse generator 11 extracts a desired wave of the burst signal BURST on the basis of the zero-cross point of the reproduced burst signal BURST, and gives the wave signal STRT to a start/stop type voltage controlled oscillator (VCO) 12 after waveform shaping.

The start/stop type VCO 12 is reset when the start pulse signal STRT is given, and oscillates with the phase being shifted to a reference phase compulsorily. Further, the frequency of the VCO 12 can be controlled on the basis of a voltage applied thereto. Since the frequency is selected to a frequency 4fsc four times higher than the subcarrier frequency fsc, this oscillation signal is outputted as a write clock signal WCK. Further, the write clock signal WCK is given to a frequency discriminator 14 through a first switching circuit 13.

Figure 3:
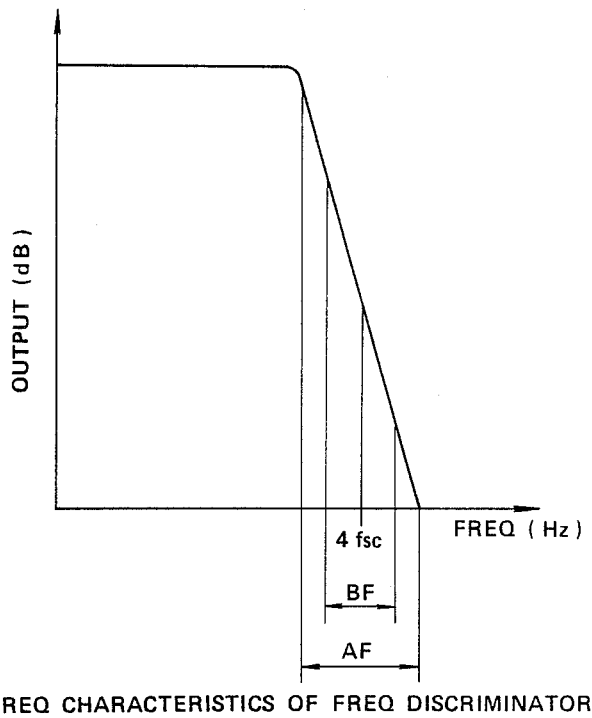
FIG. 3 is a diagram showing the frequency characteristics of a frequency discriminator included in the write clock generator according to the present invention shown in FIG. 2.

The frequency discriminator 14 is composed of a low-pass filter, for instance. As shown in FIG. 3, the frequency characteristics are such that the frequency 4fsc four times higher than the subcarrier frequency is located roughly at a center of the frequency discrimination range AF (cut-off frequency range), and the frequency band BF within which the frequency 4fsc can fluctuate according to the time base fluctuations of the reproduced video signal VDIN is located within this frequency discrimination range AF. Therefore, it is possible to obtain a discrimination signal S14 the amplitude of which varies according to the frequency of the write clock signal WCK through this frequency discriminator 14.

A peak detector 15 holds the peak voltage of the discrimination signal S14 supplied from the frequency discriminator 14 and rectifies it into a dc voltage, and the dc voltage signal S15 is given to and held by a first holding circuit 17 through a second switching circuit 16.

Here, since the first switching circuit 13 and the second switching circuit 16 are switched in linkage with each other, when the first switching circuit 13 is switched to a first input terminal 13a to which the write clock signal WCK is given, the second switching circuit 16 is switched to a first output terminal 16a connected to the first holding circuit 17. Therefore, the holding circuit 17 holds the dc voltage signal S15 representative of the frequency of the write clock signal WCK.

Further, in the write clock generator 10, the reproduced horizontal synchronizing signal H of the reproduced synchronizing signal SYNC separated through the synchronizing burst separator 1 (shown in FIG. 1) is given to a PLL (phase locked loop) circuit 19. The PLL circuit 19 generates a frequency fluctuation signal S19 which fluctuates with a frequency 4fsc four times higher than the subcarrier frequency fsc as its center and gives the signal S19 to the second input terminal 13b of the first switching circuit 13, the signal S19 being obtained by multiplying the horizontal synchronizing signal H so as to include the time base fluctuations as they are.

A second holding circuit 20 holds the dc voltage signal S15 of the peak detector 15 when the first switching circuit 13 is connected to the second input terminal 13b and the second switching circuit 16 is connected to the second output terminal 16b in linkage with the first switching circuit 13. Therefore, the holding circuit 20 holds the dc voltage signal S15 according to the frequency of the frequency fluctuation signal S19.

The two held output signals S17 and S20 of the first and second holding circuits 17 and 20 are given to a differential voltage detector 21, respectively and subtracted by the differential voltage detector 21. The difference voltage signal S21 obtained by the subtraction is given to the start/stop type VCO 12 as a control signal. In response to this control signal S21 the VCO 12 is controlled and oscillates in such a way that the difference voltage signal S21 becomes zero in voltage. Therefore, the write clock signal WCK includes frequency fluctuations of the frequency fluctuation signal S19.

Here, the switching circuits 13 and 16 are controllably switched by a switching controller 18. A reproduced horizontal synchronizing signal H is given to the switching controller 18, and the controller 18 forms a switching control signal S18 the logical level of which is reversed for each horizontal synchronization time interval, for instance, on the basis of the reproduced horizontal synchronizing signal H in order to switch the switching circuits 13 and 16 for each horizontal synchronization time interval.

In the circuit configuration shown in FIG. 2, since the start/stop type VCO 12 is reset for each horizontal synchronization time interval in response to the start pulse signal STRT formed by the start pulse generator 11 in response to the reproduced burst signal BURST, the initial phase of the write clock signal WCK matches the phase of the reproduced video signal VDIN.

Further, the frequency of the write clock signal WCK is converted into a dc voltage signal S15 by the write clock signal frequency controlling means composed of the first switching circuit 13, the frequency discriminator 14, the peak detector 15, and the second switching circuit 16, and is held by the first holding circuit 17. In contrast with this, the frequency fluctuation signal S19 formed on the basis of the reproduced horizontal synchronizing signal H is converted into a dc voltage signal 16 by the write clock signal frequency controlling means composed of the first switching circuit 13, the frequency discriminator 14, the peak detector 15, and the second switching circuit 16, and is held by the second holding circuit 20.

These held voltage signals S17 and S20 are subtracted by the differential voltage detector 21. The difference voltage signal S21 is applied to the VCO 12 to control the oscillation frequency of the VCO 12 so that the difference voltage becomes zero. As described above, the write clock signal WCK involves the time base fluctuations of the frequency fluctuation signal S19, that is, the time base fluctuations of the reproduced video signal VDIN.

As described above, according to the circuit shown in FIG. 2, it is possible to obtain a write clock signal WCK having the initial phase information given by the reproduced burst signal BURST and the frequency fluctuation information given by the reproduced horizontal synchronizing signal H. Therefore, the phase information on the reproduced video signal VDIN is detected by using the oscillation output of the VCO 12 oscillating on the basis of the reproduced burst signal BURST as the write clock signal WCK, and the frequency fluctuation information on the reproduced video signal VDIN is detected by allowing the frequency of the write clock signal WCK to be fluctuated on the basis of the frequency fluctuation signal S19. Since the circuit is configured as described above, it is possible to simplify the circuit configuration without use of the conventional complicated phase synchronizing circuit which compulsorily implements the phase synchronization after the frequency fluctuation information has been detected.

Further, since the route through which the frequency is detected is common to the write clock signal and the frequency fluctuation signal, an error due to temperature difference in the route being not generated, it is possible to detect the frequency difference precisely.

In operation, the VCO 12 starts to oscillate on the basis of the start pulse signal STRT formed by the start pulse generator 11 on the basis of one wave of the reproduced burst signal BURST, and the oscillation output is generated as the write clock signal WCK. Therefore, the initial phase of the write clock signal WCK is in synchronizm with the phase of the reproduced burst signal BURST, that is, the reproduced video signal VDIN.

Further, the frequency of the write clock signal WCK is detected in the form of amplitude fluctuation by the frequency discriminator 14 and further converted into a dc voltage signal through the peak detector 15, being held by the holding circuit 17. On the other hand, a dc voltage signal varying according to the frequency of the frequency fluctuation signal S19 is held in the same way. The signal S19 is formed by the PLL circuit 19 so as to have the time base fluctuations of the reproduced video signal VDIN on the basis of the reproduced horizontal synchronizing signal H.

Therefore, since a control signal S21 is given from the differential voltage detector 21 to the VCO 12 to reduce the difference between these two held dc voltage signals S17 and S20, the write clock signal WCK is to follow up the time base fluctuations of the reproduced video signal VDIN.

As a result, the write clock signal WCK accurately includes the phase information and the time base fluctuation information on the reproduced video signal VDIN. Therefore, when the video signal is written in the memory 5 in response to this write clock signal WCK, it is possible to obtain a picture having a good reproducibility. On the other hand, the circuit configuration is markedly simplified as compared with the conventional one.

In addition, since the write clock signal WCK and the frequency fluctuation signal S19 are F-V converted through the same route, it is possible to effectively cancel signal level fluctuations due to temperature change in both the signals WCK and S19.

Figure 4:
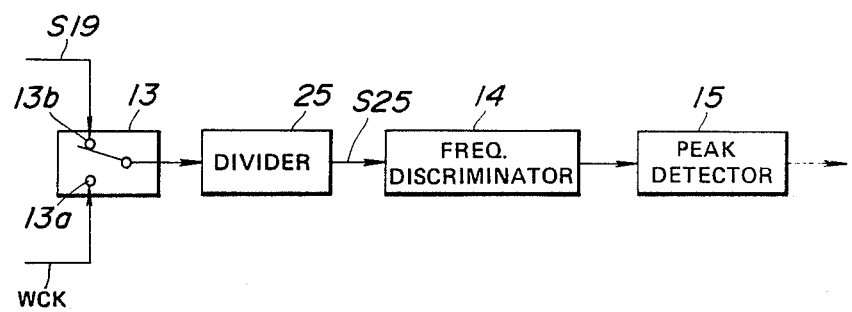
FIG. 4 is a schematic block diagram showing a second embodiment of the write clock generator according to the present invention.

FIG. 4 shows a second embodiment of the present invention, which includes a circuit element for preventing the state where the frequency difference signal S21 cannot be detected accurately because the duty factor is different between the write clock signal WCK and the frequency fluctuation signal S19.

Figure 5:
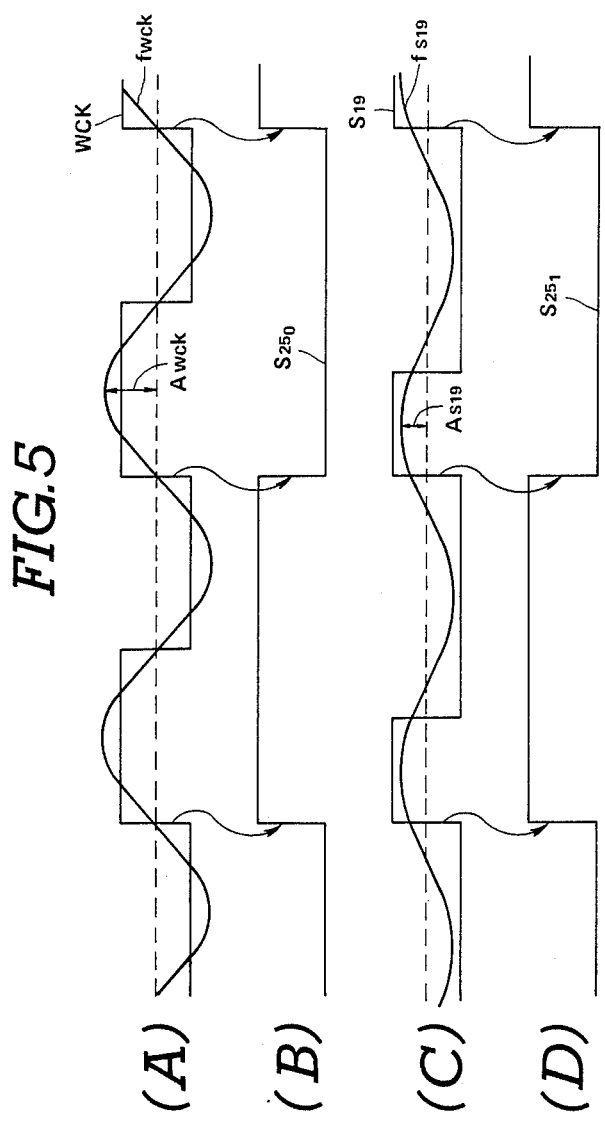
FIG. 5 (A-D) are timing charts for assistance in explaining the function of a frequency divider included in the write clock generator shown in FIG. 4.

For instance, in the case where the duty factor of the write clock signal WCK is 50% and that of the frequency fluctuation signal S19 is 30%, as depicted in FIGS. 5(A) and (C), even if the frequencies of both the signals WCK and S19 are the same, the amplitude $A_{WCK}$ of the fundamental harmonic component $f_{WCK}$ of the write clock signal WCK is greater than that $A_{S19}$ of the fundamental harmonic component $f_{S19}$ of the frequency fluctuation signal S19 after Fourier transformation. As a result, when the write clock signal WCK and the frequency fluctuation signal S19 having a different duty factor, respectively are passed through the frequency discriminator 14 shown in FIG. 2, since the amplitudes of the inputted fundamental harmonic components are different from each other, the output signal S14 has different amplitudes in spite of the fact that the frequency is the same. Thus, the oscillation of the start/stop type VCO 12 is controlled erroneously.

To overcome the above problem, in the embodiment shown in FIG. 4, a ½ divider 25 is further disposed between the first switching circuit 13 and the frequency discriminator 14 to always keep the duty factor of the signal S25 at 50%, for instance. Therefore, the write clock signal WCK having a duty factor 50% as shown in FIG. 5(A) is divided into a signal S25₀ having a duty factor 50% as shown in FIG. 5(B), and the frequency fluctuation signal S19 having a duty factor 30% as shown in FIG. 5(C) is divided into a signal S25, having a duty factor 50% as shown in FIG. 5(D).

According to the second embodiment shown in FIG. 4, even when the duty factor is different between the frequency fluctuation signal S19 and the write clock signal WCK, it is possible to accurately detect the difference in frequency between the two signals S19 and WCK, and therefore it is possible to permit the write clock signal WCK to follow up the frequency fluctuations of the reproduced video signal VDIN.

In the above-mentioned embodiment, the frequency discriminator 14 composed of low-pass filters has been explained; however, without being limited to this, it is possible to use a band-pass filter, a high-pass filter, etc. In summary, it is possible to adopt such frequency characteristics that the frequency of the fundamental harmonics of the coming signals (WCK, S19, divided signals thereof) lies within a cut-off frequency range of the filter. In these cases, it is possible to obtain the effect similar to the above-mentioned embodiments.

Further, in the above embodiments, the low-pass filter 14 and the peak detector 15 are used in common with the frequency fluctuation signal S19 and the write clock signal WCK. However, it is also possible to separate these sections independently. In this case, the switching element can be omitted.

As described above, in the write clock generator according to the present invention, the oscillation output signal of the VCO oscillating on the basis of the reproduced burst signal is outputted as the write clock signal; the frequency fluctuation signal following the time base fluctuations of the reproduced video signal is formed on the basis of the reproduced horizontal synchronizing signal; and the VCO is controlled according to the difference in frequency between the frequency fluctuation signal and the write clock signal. Therefore, it is possible to realize the write clock generator for a time base corrector of simple circuit configuration which can generate the write clock signal having accurate phase information and accurate frequency fluctuation information upon the reproduced video signal. Additionally, since the write clock signal and the frequency fluctuation signal are F-V converted through the same circuit elements, it is possible to cancel the signal fluctuations caused by temperature fluctuations, for instance.

What is claimed is:

1. A write clock generator for a time base corrector for reducing time base fluctuations involved in a reproduced video signal, which comprises:
   (a) means for generating a write clock signal in response to a burst signal included in the reproduced video signal, an initial phase of the write clock signal being synchronized with a phase of the burst signal;
   (b) means for generating a frequency fluctuation signal in response to a horizontal synchronizing signal included in the reproduced video signal;
   (c) means including a frequency discriminating circuit for detecting a difference in frequency between the write clock signal and the frequency fluctuation signal and generating a frequency difference signal; and
   (d) means connected to said write clock signal generating means, for controlling a frequency of the write clock signal in response to said frequency difference signal so that the difference in frequency between the write clock signal and the frequency fluctuation signal is reduced to zero and the write clock signal includes frequency fluctuations of the frequency fluctuation signal, wherein said frequency difference detecting means comprises:
   (e) the frequency discriminating circuit for generating a first discrimination signal having an amplitude varying according to a frequency of the write clock signal and a second discrimination signal having an amplitude varying according to a frequency of the frequency fluctuation signal, separately;
   (f) a first holding circuit for holding the first discrimination signal;
   (g) a second holding circuit for holding the second discrimination signal; and
   (h) a differential voltage detector for detecting a voltage difference between the first and second discrimination signals, the voltage difference being applied to said write clock signal frequency controlling means to reduce the voltage difference to zero.

2. The write clock generator as set forth in claim 1, wherein said frequency discriminating circuit comprises:
   (a) a first switching circuit connected to said write clock signal generating means and said frequency fluctuation signal generating means for supplying the write clock signal and the frequency fluctuation signal alternately for each horizontal synchronization time interval in response to each horizontal synchronizing signal;

(b) a frequency discriminator connected to said first switching circuit for generating the first and second discrimination signals alternately; and (c) a second switching circuit connected between said frequency discriminator and said first and second holding circuits for supplying the first and second discrimination signals alternately to said first and second holding circuits separately.

3. The write clock generator as set forth in claim 2, wherein said frequency discriminating circuit further comprises a frequency divider connected between said first switching circuit and said frequency discriminator for matching a duty factor between the write clock signal and that of the frequency fluctuation signal.

4. A write clock generator for a time base corrector for reducing time base fluctuations involved in a reproduced video signal, which comprises:

(a) means for generating a write clock signal in response to a burst signal included in the reproduced video signal, an initial phase of the write clock signal being synchronized with a phase of the burst signal;

(b) means for generating a frequency fluctuation signal in response to a horizontal synchronizing signal included in the reproduced video signal;

(c) means for detecting a difference in frequency between the write clock signal and the frequency fluctuation signal and generating a frequency difference signal; and (d) means connected to said write clock signal generating means, for controlling a frequency of the write clock signal so that the difference in frequency between the write clock signal and the frequency fluctuation signal is reduced to zero in response to the frequency difference signal, said frequency difference detecting means comprising:

(i) a frequency discriminating circuit for generating a first discrimination signal having an amplitude varying according to a frequency of the write clock signal and a second discrimination signal having an amplitude varying according to a frequency of the frequency fluctuation signal, separately;

(ii) a first holding circuit for holding the first discrimination signal;

(iii) a second holding circuit for holding the second discrimination signal;

(iv) a differential voltage detector for detecting a voltage difference between the first and second discrimination signals, the voltage difference being applied to said write clock signal frequency controlling means to reduce the voltage difference to zero; and, said frequency discriminating circuit comprises:

(v) a first switching circuit connected to said write clock signal generating means and said frequency fluctuation signal generating means for supplying the write clock signal and the frequency fluctuation signal alternately for each horizontal synchronization time interval in response to each horizontal synchronizing signal;

(vi) a frequency discriminator connected to said first switching circuit for generating the first and second discrimination signals alternately; and (vii) a second switching circuit connected between said frequency discriminator and said first and second holding circuits for supplying the first and second discrimination signals alternately to said first and second holding circuits separately.

5. The write clock generator as set forth in claim 4, wherein said frequency discriminating circuit further comprises a frequency divider connected between said first switching circuit and said frequency discriminator for matching a duty factor between the write clock signal and that of the frequency fluctuation signal.

* * * * *